(12) United States Patent
Penno et al.

(10) Patent No.: US 7,905,244 B2
(45) Date of Patent: Mar. 15, 2011

(54) EXPLOSION PRESSURE RELIEF DEVICE

(75) Inventors: Stefan Penno, Brilon (DE); Bernard Penno, Brilon (DE)

(73) Assignee: Rembe GmbH, Brilon (DE)

( * ) Notice: Subject to any disclaimer, the term of this patent is extended or adjusted under 35 U.S.C. 154(b) by 315 days.

(21) Appl. No.: 11/748,300

(22) Filed: May 14, 2007

(65) Prior Publication Data

US 2008/0110501 A1  May 15, 2008

(30) Foreign Application Priority Data

Nov. 15, 2006  (DE) .................... 20 2006 017 508 U

(51) Int. Cl.
*F16K 17/40*  (2006.01)
(52) U.S. Cl. .................................. 137/68.21; 220/89.2
(58) Field of Classification Search ............... 137/68.13, 137/68.21; 220/88.1, 88.2, 89.1; 222/189.01; 48/192; 52/1, 98
See application file for complete search history.

(56) References Cited

U.S. PATENT DOCUMENTS

| | | | | |
|---|---|---|---|---|
| 2,387,353 A | * | 10/1945 | Raymond | 220/89.2 |
| 4,338,756 A | * | 7/1982 | Crothers | 52/539 |
| 4,404,982 A | * | 9/1983 | Ou | 137/68.25 |
| 4,993,497 A | * | 2/1991 | Majors | 169/66 |
| 5,725,120 A | * | 3/1998 | Ramsey et al. | 220/276 |

FOREIGN PATENT DOCUMENTS

| | | |
|---|---|---|
| DE | 700829 | 11/1940 |
| DE | 1975001 | 12/1967 |
| DE | 2924074 A1 | 12/1980 |
| DE | 3822012 C2 | 1/1990 |
| DE | 20208576 U1 | 9/2002 |
| DE | 3822012 C2 | 2/2003 |
| DE | 10260808 A1 | 7/2004 |
| EP | 0375455 A2 | 6/1990 |
| EP | 1369628 A2 | 12/2003 |
| GB | 2051985 A | 1/1981 |
| WO | WO-03002363 | 3/2003 |

OTHER PUBLICATIONS

"Search Report from German Patent and Trademark Office", (Jul. 12, 2007), 4 pages.

* cited by examiner

*Primary Examiner* — John Rivell
(74) *Attorney, Agent, or Firm* — Pauly, Devries, Smith & Deffner, L.L.C.

(57) ABSTRACT

This invention relates to an explosion pressure relief device with a wall and a framework fixing the wall. In the case of an explosion in a container to which an explosion pressure relief device is attached, such explosion pressure relief device serves to allow the pressure wave to escape at best greatly weakened.

9 Claims, 6 Drawing Sheets

EXPLOSION PRESSURE RELIEF DEVICE

PRIORITY

Figure 1:
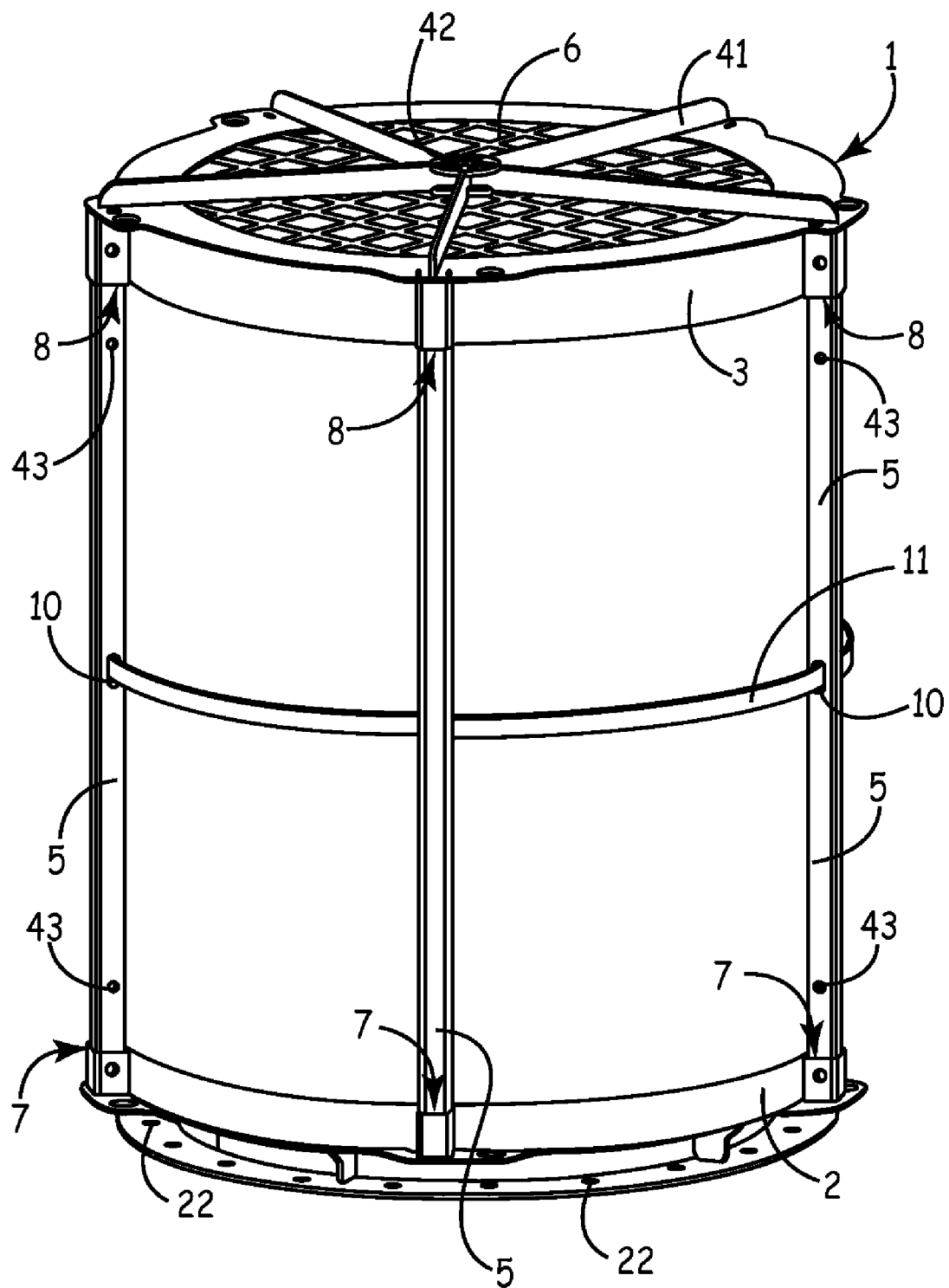

This application claims the benefit of German Application Serial No. 20 2006 017 508.3 entitled "Explosion Pressure Relief Device", filed Nov. 15, 2006, which application is hereby incorporated by reference in its entirety.

BACKGROUND OF THE INVENTION

In known explosion pressure relief devices the walls are held by a frame-work, which firmly accommodates the wall in itself and consists of profiled parts welded to each other. In the case of a pressure relief event performed by the explosion pressure relief device, the wall frequently is clogged by the escaping combustion and expansion gases as well as dusts, so that the pressure relief device cannot be used once again for preventing the exit of an explosion. Thus, safety against the exit of explosions only can be obtained by newly procuring an explosion pressure relief device. This involves considerable costs for the user.

Therefore, a need exists for an improved explosion pressure relief device.

SUMMARY OF THE INVENTION

This invention relates to an explosion pressure relief device with a wall and a framework fixing the wall. In the case of an explosion in a container to which an explosion pressure relief device is attached, such explosion pressure relief device serves to allow the pressure wave to escape at best greatly weakened and to retain a flame front and, in some implementations, dust as well as cool combustion gases. For this purpose, a pressure relief device known from the document DE 38 22 012 C2 has a wall which is composed of an undulated multi-ply layer of noble metal or comparable materials, so that a free discharge of the expansion and combustion gases leaving the container is not or only insignificantly impeded. The wall of the known explosion pressure relief device is pierced like a sieve with numerous holes, through which the radially escaping combustion gases pass approximately at right angles. Between the individual layers of noble metal or stainless steel, glass wool, rock wool or ceramic felt or a comparable material is disposed.

Accordingly, it is the object underlying the present invention to create an explosion pressure relief device which provides a solution of replacing the explosion pressure relief device, which solution is inexpensive for the user, and at the same time safely prevents the propagation of explosions.

This object is solved by an explosion pressure relief device whose framework is composed of a base element, a lid element and at least two struts disposed between base element and lid element, wherein base element or lid element have at least one groove and each have at least two insertion openings, the wall being disposed in the at least one groove (enclosure), and the at least two struts on the outside of the wall being inserted and releasably mounted in the insertion openings.

The advantage of the explosion pressure relief device of the invention consists in that the modular design of the framework and the releasable connection of the parts of the framework provides for an easy replacement of the wall affected by a pressure relief event and/or of individual parts of the framework, for instance a strut, after an explosion pressure relief event. As a result, the user of such explosion pressure relief devices can save costs, as it is not always necessary to replace the entire explosion pressure relief device and/or the wall can be cleaned, be inserted again into the framework, and be used again. The modular design of the explosion pressure relief device does not impair the safety thereof, but there is additionally achieved an increase of the rigidity of the framework. The plug-in construction of the invention with the releasable connection of the elements in addition provides for a less expensive manufacture of the framework, as simple profiled elements can be used.

In a preferred embodiment, the at least two struts are releasably attached to the base element and/or the lid element by means of screwing. In a particularly preferred embodiment, a screw connection only accessible with a special tool is used for this connection, which provides additional safety when being used in accessible systems, as it cannot easily be released. In another embodiment, the at least two struts and the base element and/or the lid element can also be pinned together by means of a bolt.

In another preferred embodiment, alternatively or in addition to screwing or pinning, an adhesive which is stable up to a specific temperature (for instance 200° C.) can be used for attaching the struts to the base element and/or lid element, the cross-linkage of which is destroyed by heating above the specific temperature. Above the specific temperature, the connection thus is releasable. Such adhesives include for instance anaerobic adhesives, in which substances effecting the cross-linkage of the adhesive are contained in the adhesive in an encapsulated form, so that the cross-linkage of the adhesive will only occur under pressure (e.g. upon screwing).

For use in tubular containers, the base element and the lid element particularly preferably each are formed substantially ring-shaped, and correspondingly the explosion pressure relief device is made substantially cylindrical. However, the use of other shapes, for instance a rectangular shape or the shape of a pentagonal prism, is also conceivable for the explosion pressure relief device. In this case, the base element and the lid element have the corresponding basic shape (e.g. rectangle or pentagon), which constitutes an annular shape.

Suitable struts substantially have a square shape. Preferably, the struts are composed of two U-shaped sections inserted into each other, which preferably are riveted to each other. The U-sections preferably are inserted into each other such that the legs of the U-sections rest against each other and the sections together form a hollow space of rectangular cross-section between the same. The construction of two U-sections is found to be particularly rigid.

In a preferred embodiment, the base element and the lid element form rectangular openings each on opposite portions of their circumference at the top and at the bottom, into which openings the struts can be inserted. For this purpose, the cross-section of the insertion openings merely is slightly larger than the cross-sectional area of the respective strut. The insertion openings are formed by walls arranged on the base or lid element, which have at least two through openings (e.g. in the form of bores) located opposite each other. The axis of these openings extends substantially vertical to the longitudinal direction of the strut to be inserted into the insertion opening. At their ends, in the region in which they are inserted into the corresponding insertion opening, the struts each have a through opening (e.g. in the form of a bore) which likewise extends substantially vertical to the longitudinal direction of the struts. When inserting the strut into the insertion opening, the openings in the walls of the insertion opening and the strut are arranged with respect to each other such that the openings in the walls of the insertion opening and in the strut generally form a through opening and the axes of the openings approximately lie on top of each other. As a simple solution for realizing a releasable attachment, a screw can for instance be arranged in this through opening as a fastening element.

As a first means for pressure relief, a bursting disk is arranged on the end face of the base element facing away from the lid element. Particularly preferably, this bursting disk is attached to the end face of the base element by means of spot-welded joints. The bursting disk provides for a pressure relief even before entrance of the combustion and expansion gases into the explosion pressure relief device, which is effected by the mechanical interaction between the front with the abrupt increase in pressure and the material of the bursting disk.

Between the openings for the fastening element, each strut has at least one further through opening (e.g. in the form of a bore) which extends substantially transverse to the longitudinal direction of the strut and in which a holding element is disposed, in accordance with another preferred embodiment. For a cylindrical explosion pressure relief device, this holding element preferably is ring-shaped. The ring-shaped holding element preferably is formed by a flat section, which extends substantially vertical to the longitudinal direction of the struts and provides additional stability to the framework in the case of a pressure relief event and prevents the outward bulging of the wall disposed inside the holding element.

Further objectives, features, advantages and possible applications of the invention can be taken from the following description of embodiments and the associated Figures. All features described and/or illustrated form the subject-matter of the present invention per se or in any combination, independent of their inclusion in individual claims or their back-reference.

DRAWINGS

Figure 2:
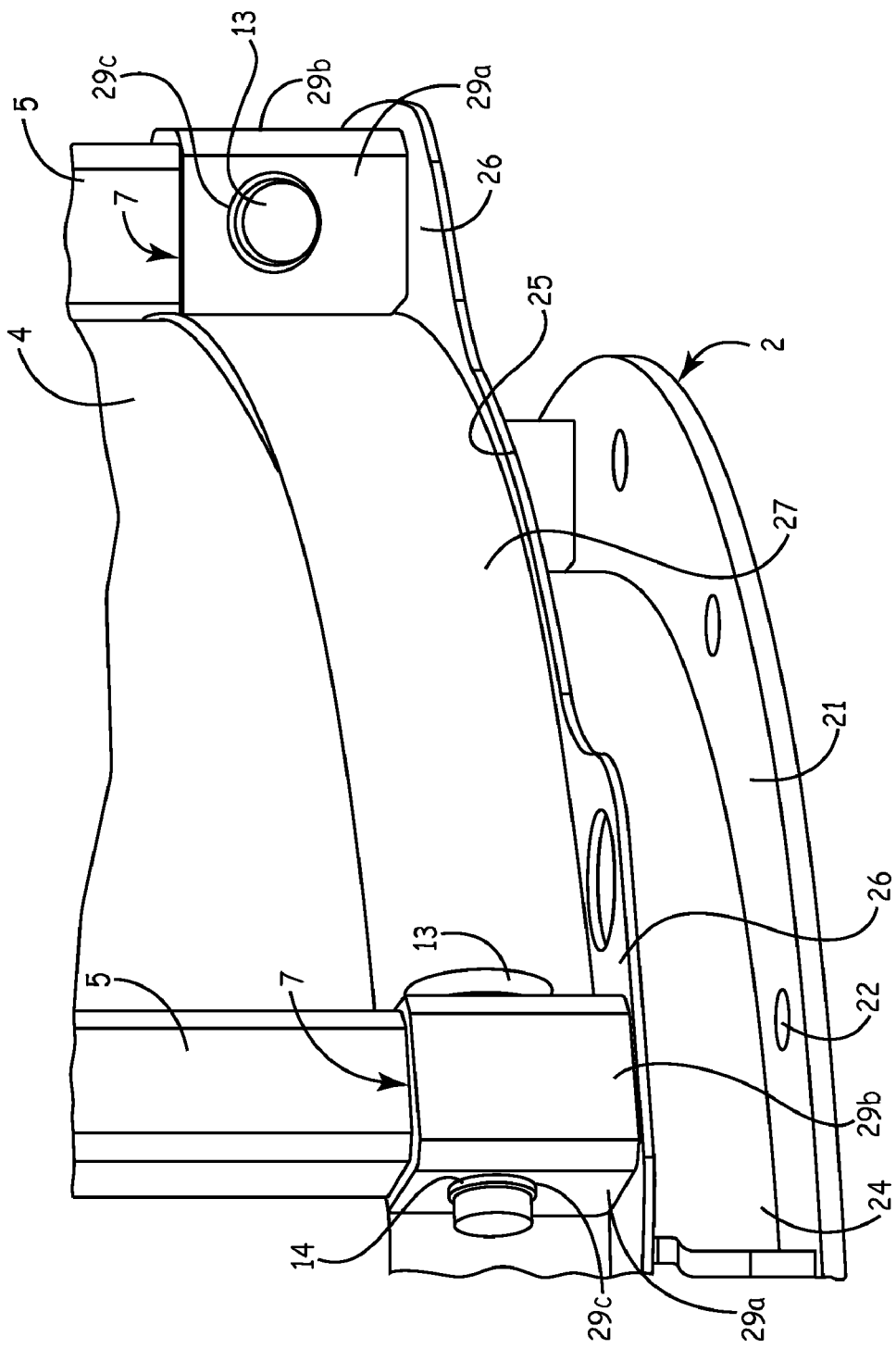
Figure 3:
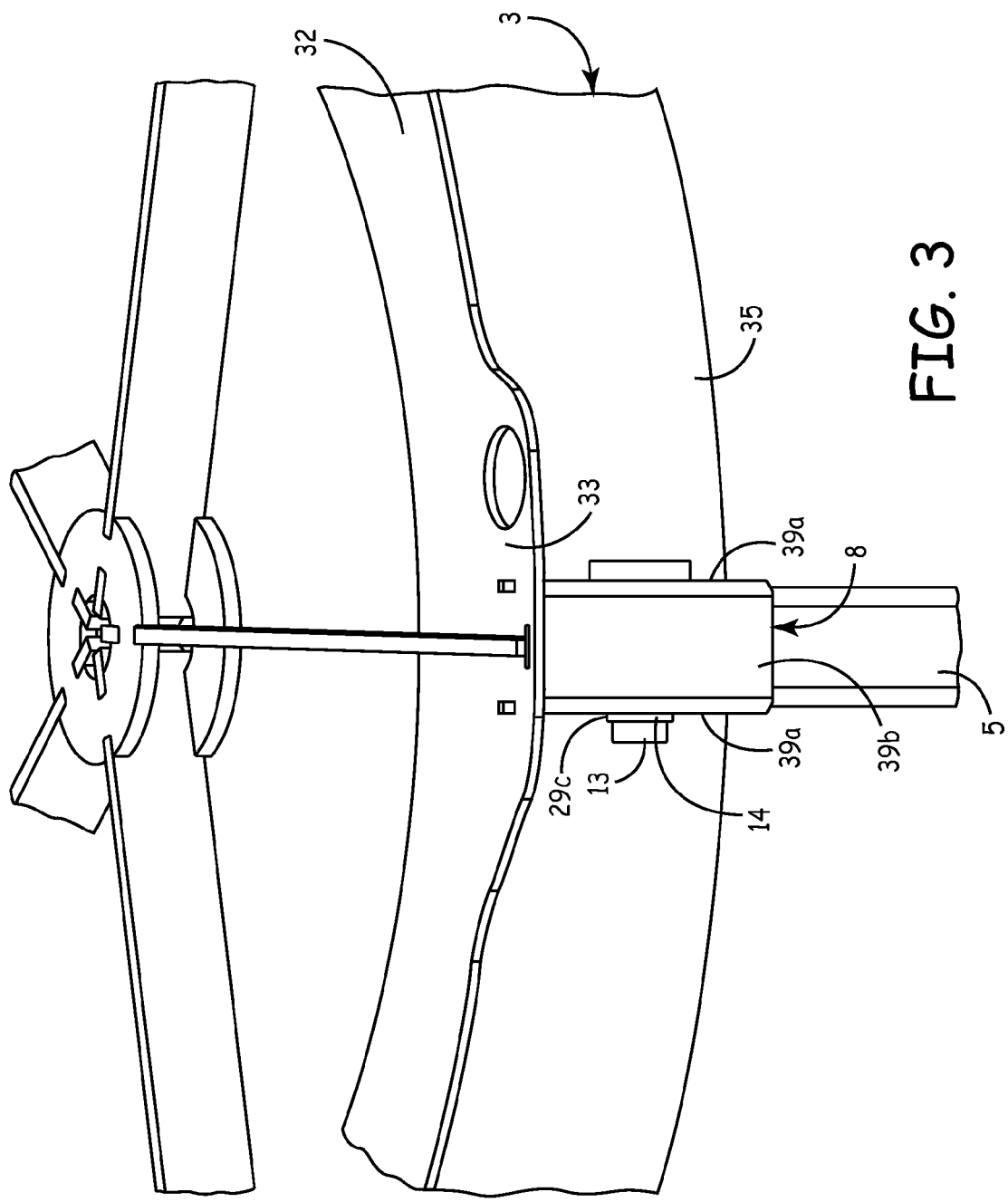
Figure 4:
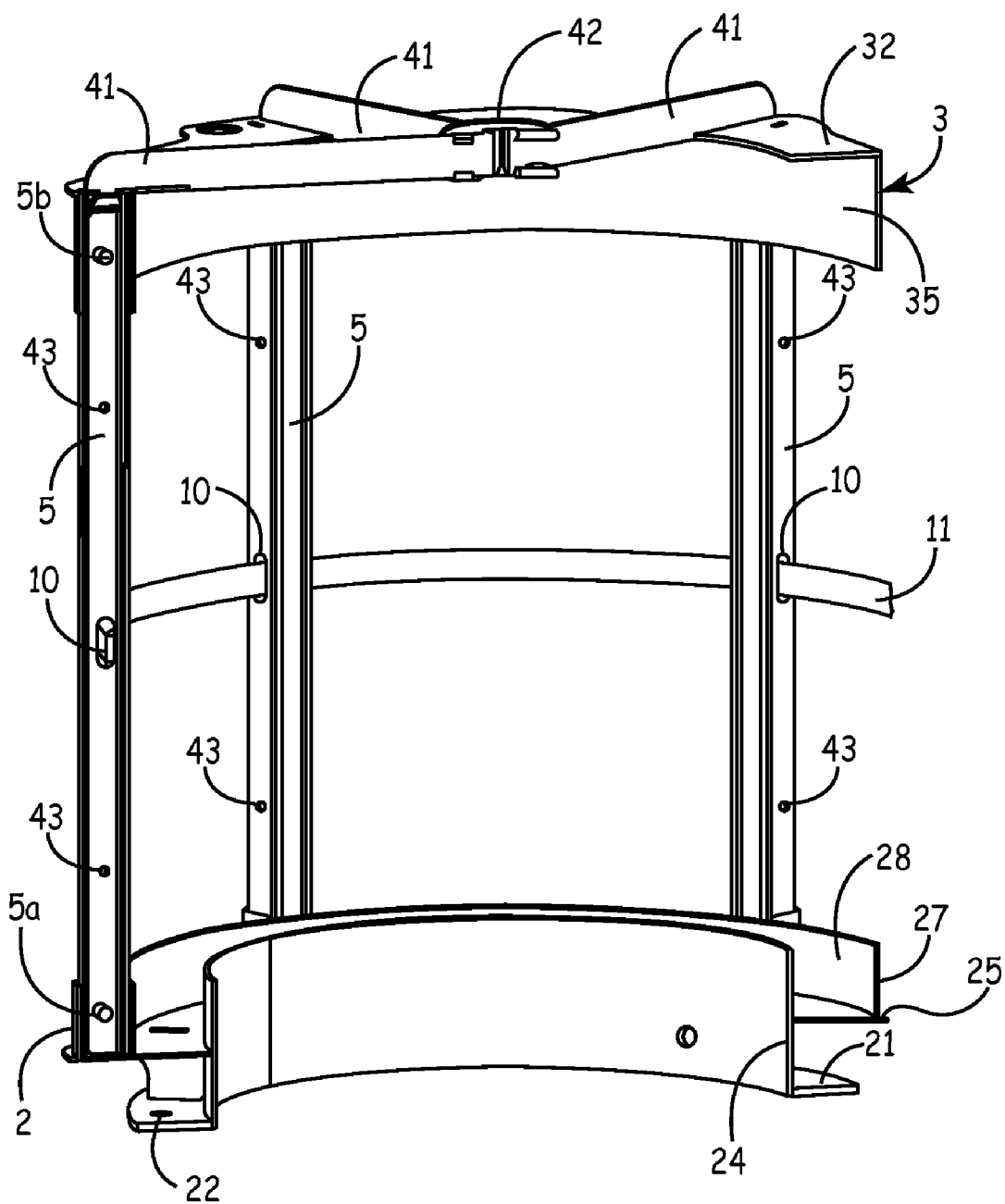
Figure 5:
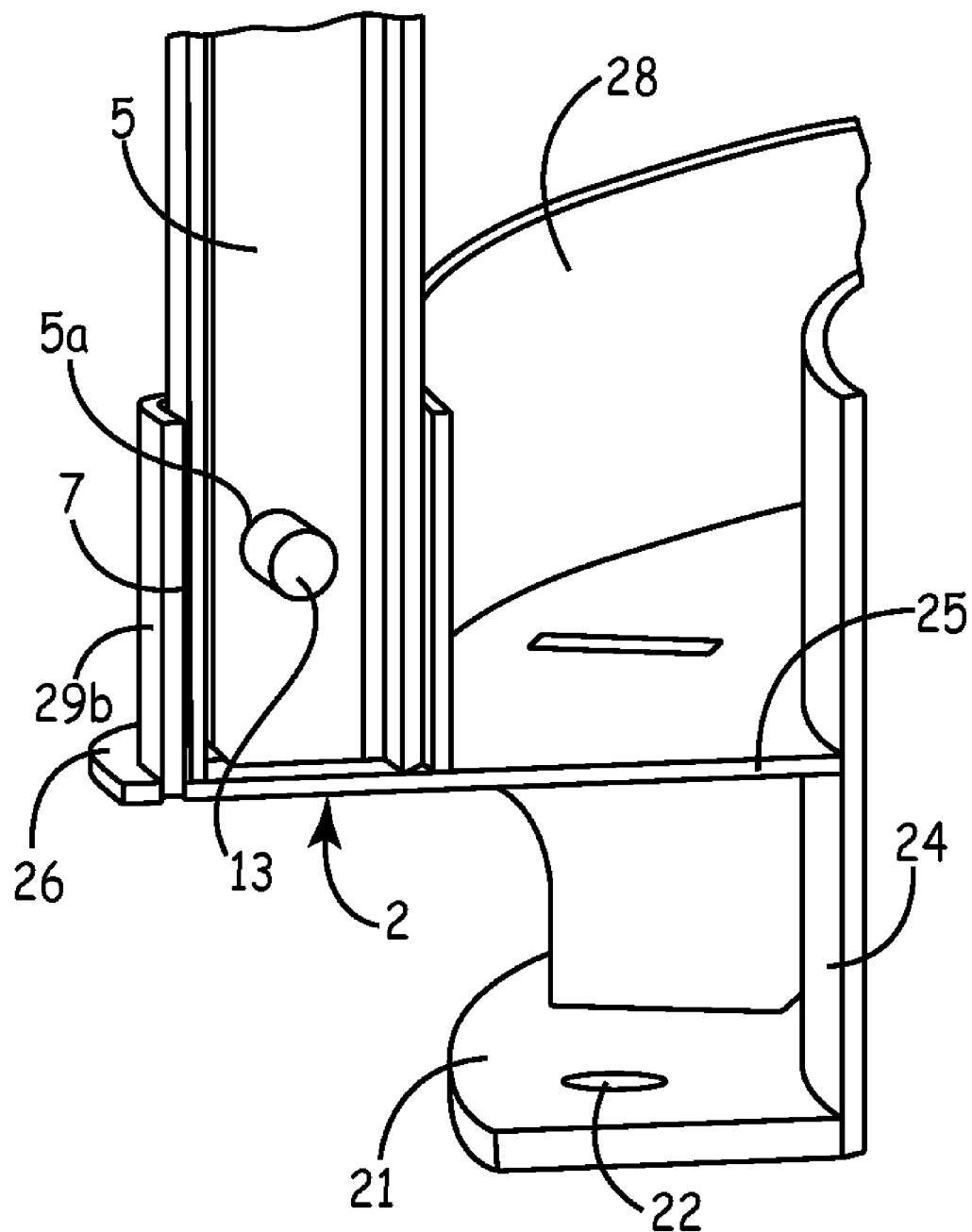
Figure 6:
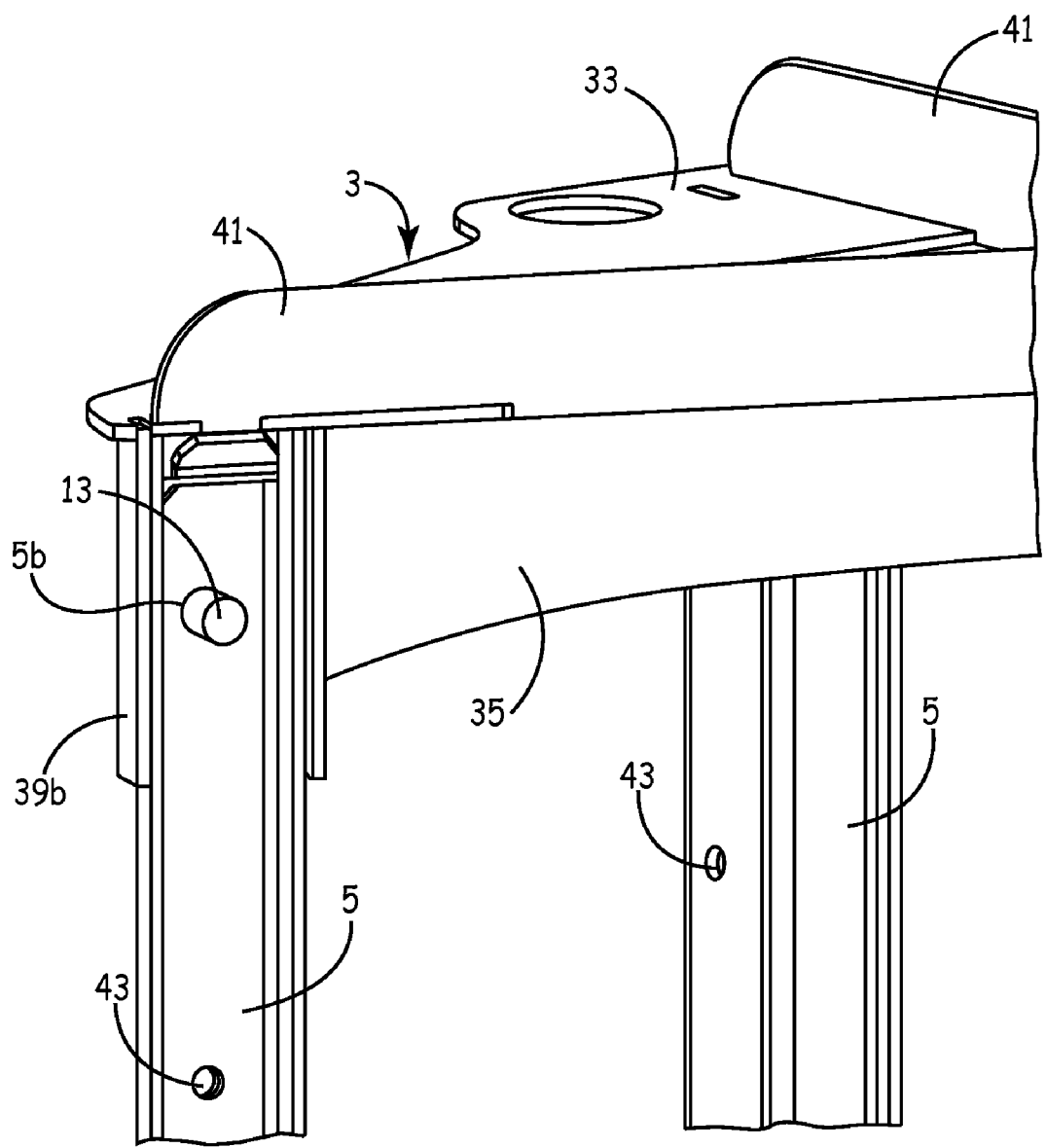

The invention may be more completely understood in connection with the following drawings, in which:

FIG. 1 shows an explosion pressure relief device of the invention in a perspective side view, FIGS. 2 and 3 show segments of the view of FIG. 1 in the vicinity of the base element or the lid element without a wall, FIG. 4 shows a cross-section through the framework of the explosion pressure relief device as shown in FIG. 1, and FIGS. 5 and 6 each show segments of this cross-section in the vicinity of the base element or lid element.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention relates to an explosion pressure relief device with a wall and a framework fixing the wall. In the case of an explosion in a container to which an explosion pressure relief device is attached, such explosion pressure relief device serves to allow the pressure wave to escape at best greatly weakened and to retain a flame front and possibly dusts and to cool combustion gases. For this purpose, a pressure relief device known from the document DE 38 22 012 C2 has a wall which is composed of an undulated multi-ply layer of noble metal or comparable materials, so that a free discharge of the expansion and combustion gases leaving the container is not or only insignificantly impeded. The wall of the known explosion pressure relief device is pierced like a sieve with numerous holes, through which the radially escaping combustion gases pass approximately at right angles. Between the individual layers of noble metal or stainless steel, glass wool, rock wool or ceramic felt or a comparable material is disposed.

The substantially cylindrical explosion pressure relief device shown in FIG. 1 has a framework 1 with a base element 2, which is disposed at its lower end, and a lid element 3 disposed at the upper end of the framework 1. The base element 2 and the lid element 3 each are formed substantially ring-shaped. Between the base element 2 and the lid element 3 five struts 5 are arranged in the direction of the longitudinal axis of the cylinder, which struts are disposed in insertion openings 7 of the base element and in insertion openings 8 of the lid element. In further embodiments, the explosion pressure relief device can also have only two, three or four or more than five struts 5, which are distributed in equal intervals around the circumference of the base element 2 or lid element 3. Inside the struts 5 and enclosed by base element 2 and lid element 3 a wall (packing) 4 is disposed. The disclosure contained in this document herewith is included in this description. The struts 5 extend along the outer circumferential surface of the wall 4.

In a preferred embodiment, the wall 4 is disposed on a circular ring of ceramic fleece, which is not shown in FIG. 1 and which is placed on the bottom of the groove 28 of the base element 2. This fleece additional serves to absorb the energy of the explosion and is enclosed by the base element 2.

In a further preferred embodiment, a further circular ring of ceramic fleece rests on the end face of the wall 4 in the vicinity of the lid element 3. On this fleece ring a circular disk made of the material of the wall (packing) 4 is disposed. This wall disk is covered by a circular metallic grid 6. Fleece ring, wall disk and grid 6 are enclosed by the lid element 3. By means of this configuration, the exit of the explosion is also prevented in the vicinity of the longitudinal direction of the explosion pressure relief device. In a further embodiment, the fleece ring can also be omitted.

Approximately centrally in longitudinal direction of the struts 5, the same each have a through opening 10, whose axis extends in a direction transverse to the longitudinal direction of the struts or to the longitudinal axis of the cylinder. In these openings 10 a ring-shaped flat section is disposed as a holding element (holding ring) 11.

The base element 2 has a flange-like portion with an end face 21, which is disposed on the side of the base element 2 opposite the lid element 3 and to which a non-illustrated bursting disk is attached by means of spot welding. By means of the openings (e.g. in the form of bores) 22 extending in the direction of the longitudinal axis of the explosion pressure relief device, for instance by means of screwing, the end face 21 is attached to a likewise non-illustrated container, which can be the starting point of an explosion. Between the bursting disk and the container, a ring-shaped seal can be provided.

The first flange-like portion with the end face 21 is adjoined by a first substantially cylindrical portion 24 of the base element 2 and the same is adjoined by a second flange-like portion 25 which has formations 26 directed radially to the outside from the wall 4. On the flange-like portion 25, a second cylindrical portion 27 is disposed in the direction of the lid element 3, which has an annularly extending groove 28 for accommodating or enclosing the wall 4.

In the vicinity of each formation 26, three wall elements 29a, 29b are disposed on the outside of the cylindrical portion 27, which together with the outer wall of the groove 28 of the cylindrical portion 27 form the insertion openings 7. The substantially plate-shaped, radially extending wall elements 29a and the substantially tangentially extending wall element 29b form the substantially rectangular insertion openings 7 for arrangement of the strut 5.

Each wall element 29a is provided with a through opening 29c extending transverse to the longitudinal direction of the strut 5 or to the longitudinal axis of the explosion pressure relief device. On its end, the longitudinal strut 5 furthermore also has a through opening 5a extending in a direction transverse to the longitudinal direction, which upon insertion of the strut 5 into the insertion opening 7 forms a through opening together with the openings 29c. In each of these through openings 5a, 29c, a screw 13 is disposed, which is fixed by means of a nut 14 screwed to the same.

The segment of the perspective side view of FIG. 1, which is represented in FIG. 3, shows a segment of the lid element 3. The lid element 3 likewise has a flange-like portion with an end face 32, which similar to the flange-like portion 25 of the base element 2 has radially extending formations 33. In the direction of the base element 2, the flange-like portion is adjoined by a cylindrical portion 35. The cylindrical portion 35 of the lid element 3 forms a ring-shaped contact surface for the wall 4, which extends in the direction of the longitudinal axis, so that said wall is enclosed by the lid element 3.

Similar to the base element 2, the lid element 3 also has two radially extending wall elements 39a in the vicinity of each formation 33 and one tangentially extending wall element 29b each, which together with the cylindrical portion 35 form the insertion openings 8. On the side of the end face 32 of the flange-like portion of the lid element 3, one radially extending strut 41 is each disposed in the vicinity of each formation 33, which struts are connected at their ends by a center element 42 consisting of two interconnected circular plates in the vicinity of the longitudinal axis of the explosion pressure relief device. These struts 41 serve to prevent an outward bulging of the wall disposed in the lid element 3.

Similar to the base element 2, the struts 5 are also fastened in the respective insertion openings 8 of the lid element 3 by means of one screw 13 each, which extends through the corresponding openings 39c or 5b, and one nut 14.

The strut 5 each consists of two U-sections disposed within each other, which in the vicinity of the legs of the U-section are riveted to each other in rivet connection areas 43.

The explosion pressure relief device of the invention has a framework with a higher rigidity and a reduced weight as compared to the prior art, which has a modular design and nevertheless provides the required safety against the escape of a flame front.

It will be appreciated that while the present invention has been described with reference to several particular implementations, those skilled in the art will recognize that many changes may be made hereto without departing from the spirit and scope of the present invention.

The invention claimed is:

1. An explosion pressure relief device comprising:
a wall and a framework holding the wall, the framework comprising a base element, a lid element and at least two struts disposed between base element and lid element, wherein base element or lid element have at least one groove and at least two insertion openings each, the wall being disposed in the at least one groove, and the at least two struts on the outside of the wall being inserted and releasably mounted in the insertion openings, wherein the struts substantially have a square shape and are composed of two U-shaped sections, and wherein each strut has at least one further opening extending substantially transverse to the longitudinal direction of the strut between the openings for the fastening element, in which opening a holding element is disposed.

2. The explosion pressure relief device of claim 1, wherein the at least two struts are screwed to the base element and/or the lid element.

3. The explosion pressure relief device of claim 1, wherein the at least two struts are attached to the base element and/or the lid element by means of an adhesive which is stable up to a specific, predetermined temperature.

4. The explosion pressure relief device of claim 1, wherein the base element and the lid element each are formed substantially ring-shaped.

5. The explosion pressure relief device of claim 1, wherein the walls of the insertion openings have openings located opposite each other, and the struts likewise have one opening each at their ends, which openings serve to accommodate a fastening element.

6. The explosion pressure relief device of claim 5, wherein the axis of the openings and the axis of a pin-shaped fastening element disposed in the openings extend substantially vertical to the longitudinal direction of the struts.

7. The explosion pressure relief device of claim 1, wherein the end face of the base element facing away from the lid element a bursting disk is disposed.

8. The explosion pressure relief device of claim 7, wherein the bursting disk is attached to the end face of the base element by means of spot-welded joints.

9. The explosion pressure relief device of claim 1, wherein the holding element is ring-shaped.

* * * * *

UNITED STATES PATENT AND TRADEMARK OFFICE
CERTIFICATE OF CORRECTION

| | | |
|---|---|---|
| PATENT NO. | : 7,905,244 B2 | Page 1 of 1 |
| APPLICATION NO. | : 11/748300 | |
| DATED | : March 15, 2011 | |
| INVENTOR(S) | : Stefan Penno et al. | |

It is certified that error appears in the above-identified patent and that said Letters Patent is hereby corrected as shown below:

On the Title page of the patent, in the inventor information (75), the second named inventor's first name is misspelled. Please change the name of the second named inventor as follows:

Please change "Bernard Penno" to --Bernhard Penno--.

Signed and Sealed this
Twentieth Day of September, 2011

David J. Kappos
*Director of the United States Patent and Trademark Office*